United States Patent
Sakakibara

(10) Patent No.: US 11,040,701 B2
(45) Date of Patent: Jun. 22, 2021

(54) WIPER MOUNT BRACKET

(71) Applicants: KABUSHIKI KAISHA TOYOTA JIDOSHOKKI, Kariya (JP); TOYOTA JIDOSHA KABUSHIKI KAISHA, Toyota (JP)

(72) Inventor: Tomoyo Sakakibara, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 16/360,314

(22) Filed: Mar. 21, 2019

(65) Prior Publication Data

US 2019/0299935 A1 Oct. 3, 2019

(30) Foreign Application Priority Data

Mar. 27, 2018 (JP) .............................. JP2018-060369

(51) Int. Cl.
*B60S 1/34* (2006.01)
*B60S 1/04* (2006.01)
*B60S 1/08* (2006.01)

(52) U.S. Cl.
CPC ........... *B60S 1/3488* (2013.01); *B60S 1/0433* (2013.01); *B60S 1/08* (2013.01)

(58) Field of Classification Search
USPC .......... 248/205.1; 15/250.35, 250.16, 250.19
See application file for complete search history.

(56) References Cited

U.S. PATENT DOCUMENTS

| | | | | |
|---|---|---|---|---|
| 4,982,993 A | * | 1/1991 | Okazaki ................ | B60S 1/0405 15/250.19 |
| 5,504,966 A | * | 4/1996 | Lee ........................ | B60S 1/0405 15/250.16 |
| 6,168,223 B1 | * | 1/2001 | Egner-Walter ............ | B60S 1/04 15/250.29 |
| 7,552,502 B2 | * | 6/2009 | Kagawa ................ | B60S 1/0402 15/250.31 |
| 9,857,456 B2 | * | 1/2018 | Hara ..................... | G01S 7/4813 |

(Continued)

FOREIGN PATENT DOCUMENTS

| | | |
|---|---|---|
| CN | 102530094 A | 7/2012 |
| CN | 206012549 U | 3/2017 |

(Continued)

*Primary Examiner* — Monica E Millner
(74) *Attorney, Agent, or Firm* — Sughrue Mion, PLLC

(57) ABSTRACT

A wiper mount bracket including an attachment portion, a pair of first welded portions each of which is provided with a welding point to be spot welded to the vehicle body, a second welded portion that is disposed on one side with respect to the attachment portion and the first welded portions in a direction perpendicular to an arrangement direction of the pair of first welded portions and that is provided with a welding point to be spot welded to the vehicle body, and a recess portion that is disposed between the second welded portion and the attachment portion together with the first welded portions. A protruding bead through which an input load from the wiper driving unit is transmitted toward an outer edge of the first welded portion is provided in a vicinity of each of the welding points of the first welded portions.

4 Claims, 12 Drawing Sheets

(56) References Cited

U.S. PATENT DOCUMENTS

| | | | | |
|---|---|---|---|---|
| 2005/0218688 A1* | 10/2005 | Neubauer | ............ | B60S 1/0447 |
| | | | | 296/96.17 |
| 2015/0139631 A1* | 5/2015 | Caillot | .................. | B60S 1/488 |
| | | | | 392/480 |
| 2016/0185391 A1 | 6/2016 | Suzuki et al. | | |
| 2016/0306030 A1* | 10/2016 | Hara | .................... | G01S 7/4813 |

FOREIGN PATENT DOCUMENTS

| | | |
|---|---|---|
| JP | 2012-148744 A | 8/2012 |
| JP | 2014-80168 A | 5/2014 |
| JP | 2016-120875 A | 7/2016 |

\* cited by examiner

WIPER MOUNT BRACKET

TECHNICAL FIELD

The present disclosure relates to a wiper mount bracket.

BACKGROUND

As a wiper mount bracket in the related art, a wiper motor bracket described in Japanese Unexamined Patent Publication No. 2014-80168 has been known. The wiper motor bracket described in Japanese Unexamined Patent Publication No. 2014-80168 is installed between a front wall and a rear wall at the central portion of a cowl inner panel in a vehicle width direction. A rear end portion of the wiper motor bracket is bonded to the rear wall at two positions through spot welding. A front end portion of the wiper motor bracket is bonded to a seat surface formed on the front wall at two positions through spot welding.

SUMMARY

Meanwhile, when a wiper driving unit including a wiper motor link or the like is attached to the wiper mount bracket as described above, there is a problem as follows. That is, for example, when a wiper is operated with snow accumulated on window glass, a reaction force from the accumulated snow is input to the wiper mount bracket via the wiper or the wiper driving unit in some cases. In this case, a load input from the wiper driving unit is transmitted along a ridge of a level difference portion of the wiper mount bracket which has a high rigidity. Therefore, the wiper mount bracket is deformed to rotate around a welding point and a moment is generated on the welding point. Accordingly, a torque is generated on the welding point and thus there is a possibility that a crack is generated in the wiper mount bracket.

An object of the present disclosure is to provide a wiper mount bracket with which it is possible to reduce a torque generated on a welding point.

A wiper mount bracket according to an aspect of the present disclosure is a wiper mount bracket for attaching a wiper driving unit driving a wiper to a vehicle body, the wiper mount bracket including an attachment portion to which the wiper driving unit is attached and that has an inverted U-shaped section, a pair of first welded portions that is disposed on right and left sides of the attachment portion in a vehicle width direction with the attachment portion interposed therebetween and each of which is provided with a welding point to be spot welded to the vehicle body, a second welded portion that is disposed on one side with respect to the attachment portion and the first welded portions in a direction perpendicular to an arrangement direction of the pair of first welded portions and that is provided with a welding point to be spot welded to the vehicle body, and a recess portion that is disposed between the second welded portion and the attachment portion together with the first welded portions. A protruding bead through which an input load from the wiper driving unit is transmitted toward an outer edge of the first welded portion is provided in a vicinity of each of the welding points of the first welded portions.

For example, when a reaction force from accumulated snow is input to the wiper mount bracket via the wiper and the wiper driving unit, the input load is transmitted toward the outer edge of the first welded portion along the protruding bead. Therefore, the wiper mount bracket is deformed to rotate around the welding point of the first welded portion and a moment is generated on the welding point. At this time, the bead is disposed in the vicinity of the welding point of the first welded portion. That is, the bead is disposed closer to the welding point side than the level difference portion that connects the first welded portion and the recess portion to each other. Therefore, a moment arm to the welding point becomes small in comparison with a case where the input load from the wiper driving unit is transmitted along a ridge of the level difference portion and thus a moment generated on the welding point becomes small. Accordingly, a torque generated on the welding point is reduced.

The bead may have an approximately triangular shape that becomes narrower toward the outer edge of the first welded portion from the attachment portion. According to such a configuration, the input load from the wiper driving unit is likely to be transmitted toward the outer edge of the first welded portion along the bead.

The bead may extend to the outer edge of the first welded portion from the attachment portion. According to such a configuration, the input load from the wiper driving unit is smoothly transmitted to the outer edge of the first welded portion along the bead.

The bead may be provided with a rising portion integrated with a level difference portion that connects the first welded portion and the recess portion to each other. According to such a configuration, it is possible to easily form the bead together with the level difference portion.

According to the present disclosure, it is possible to reduce a torque generated on a welding point.

DETAILED DESCRIPTION

Figure 1:
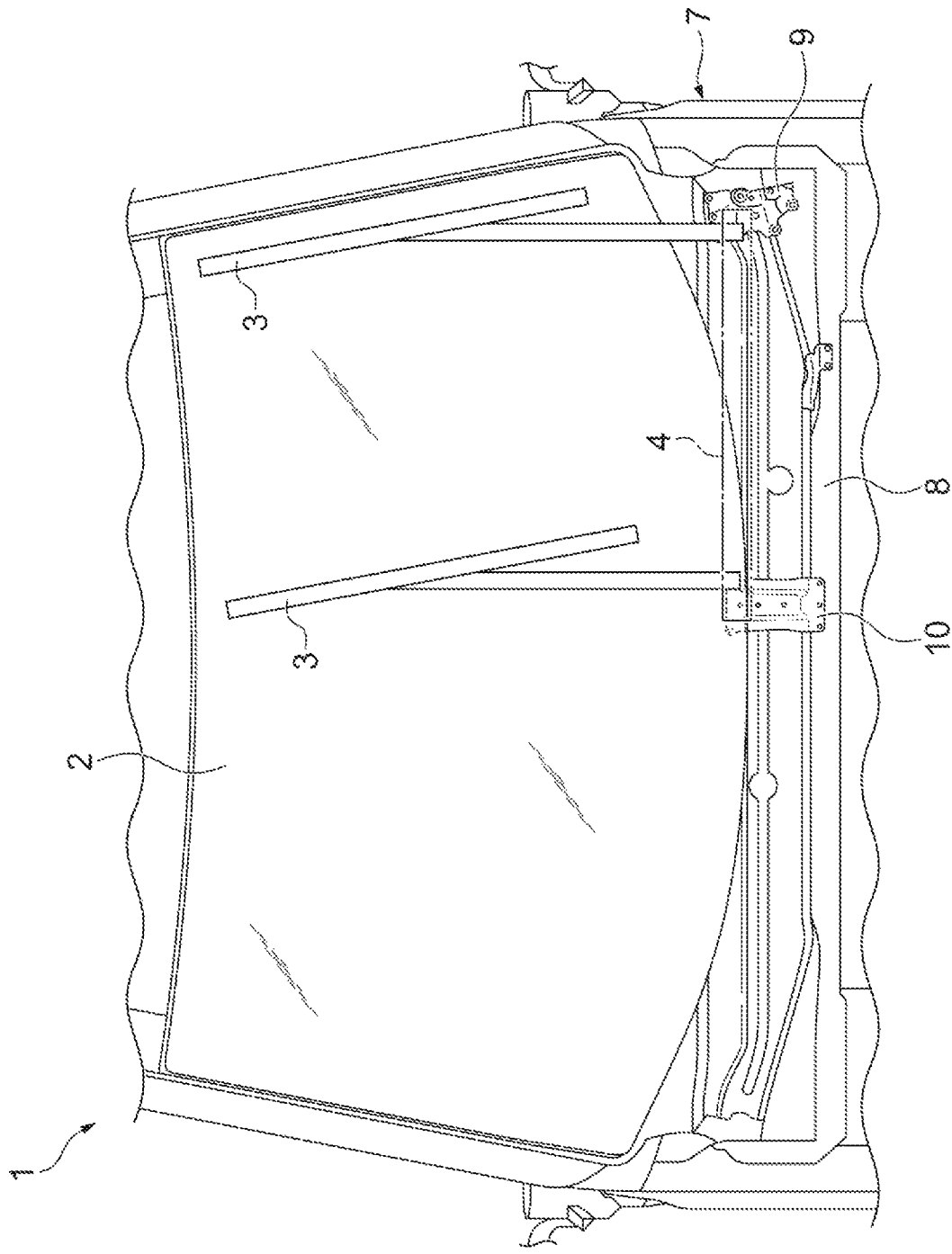
FIG. 1 is a front view illustrating an area including a windshield of a vehicle in which wiper mount brackets according to an embodiment of the present disclosure are installed.

Hereinafter, an embodiment of the present disclosure will be described in detail with reference to drawings. Note that, in the drawings, the same or similar elements will be given the same reference numerals and description thereof will not be repeated.

FIG. 1 is a front view illustrating an area including a windshield of a vehicle in which wiper mount brackets according to an embodiment of the present disclosure are installed. In FIG. 1, a vehicle 1 is provided with two wipers 3 that wipe off rain water, snow, and dirt adhering to a windshield 2 and a wiper driving unit 4 that drives the wipers 3.

Figure 2:
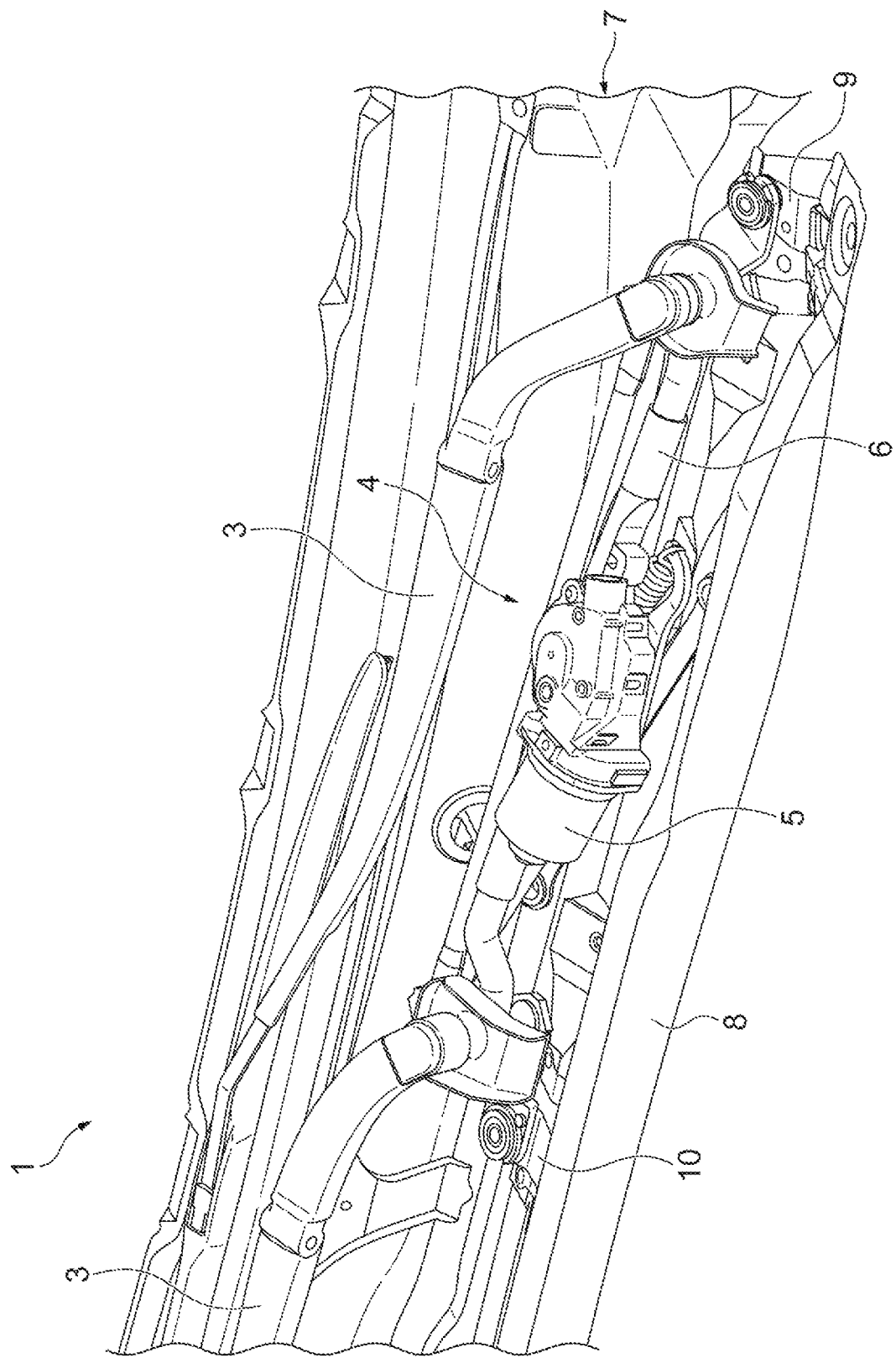
FIG. 2 is a perspective view of a wiper driving unit illustrated in FIG. 1.

As illustrated in FIG. 2, the wiper driving unit 4 includes a wiper motor 5 and a wiper motor link 6 that transmits rotation of the wiper motor 5 to the wipers 3. Base end portions of the wipers 3 are fixed to the vicinities of opposite end portions of the wiper motor link 6, respectively. The wiper motor 5 is attached to a cowl top outer 8 of a vehicle body 7 via a motor mount bracket (not shown).

In addition, the vehicle 1 is provided with wiper mount brackets 9 and 10 for attaching the wiper driving unit 4 to the vehicle body 7. The wiper mount brackets 9 and 10 are members for attaching the wiper motor link 6 of the wiper driving unit 4 to the cowl top outer 8. Note that, although not shown, a cowl louver is disposed outward of the cowl top outer 8 such that the wiper driving unit 4 is hidden.

The wiper mount bracket 9 is bonded to one end portion of the cowl top outer 8 in a vehicle width direction. The wiper mount bracket 10 is bonded to the central portion of the cowl top outer 8 in the vehicle width direction. One end portion of the wiper motor link 6 is attached to the wiper mount bracket 9 and the other end portion of the wiper motor link 6 is attached to the wiper mount bracket 10.

Figure 3:
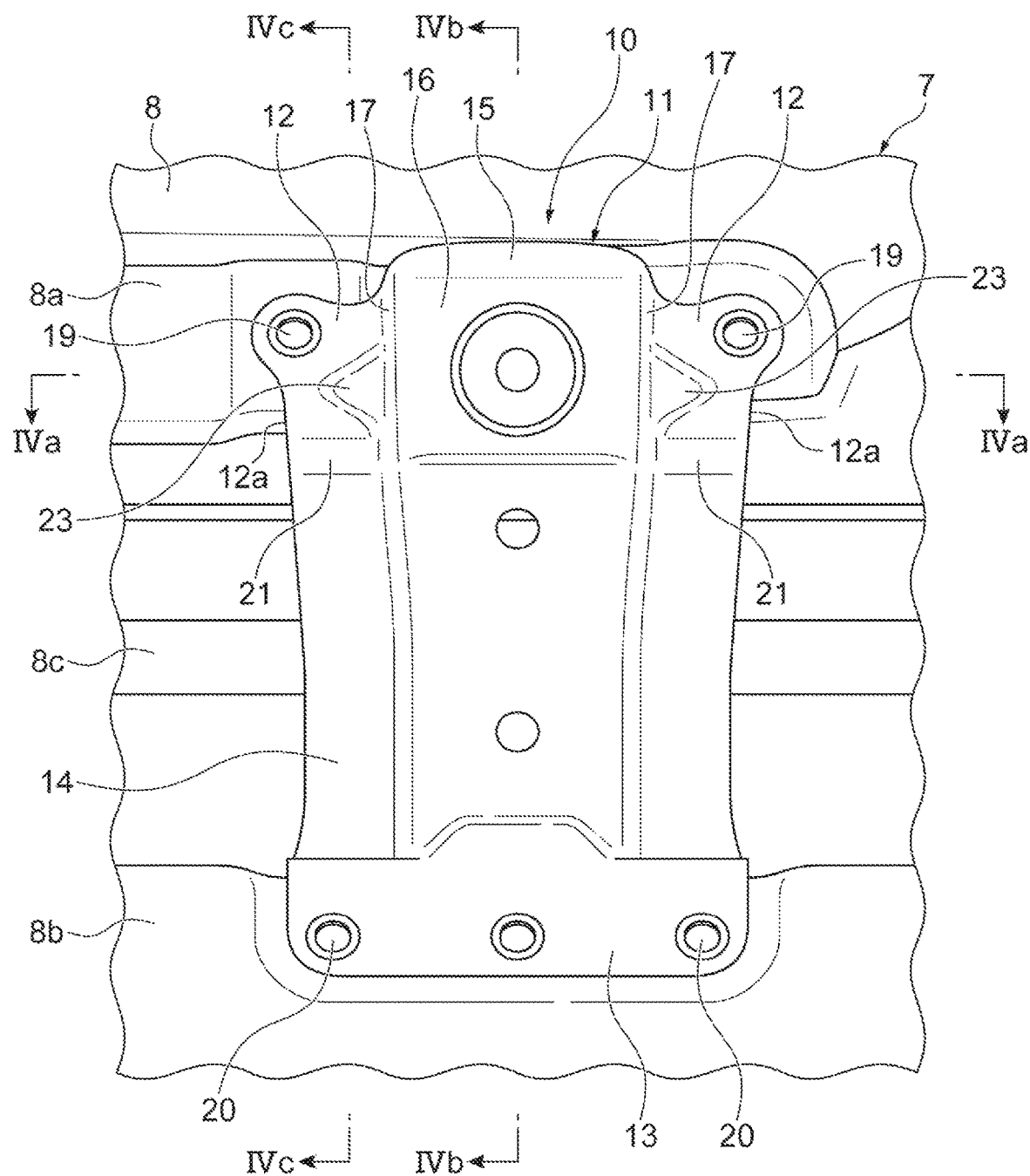
FIG. 3 is a plan view illustrating the wiper mount bracket according to the embodiment of the present disclosure.
Figure 4A:
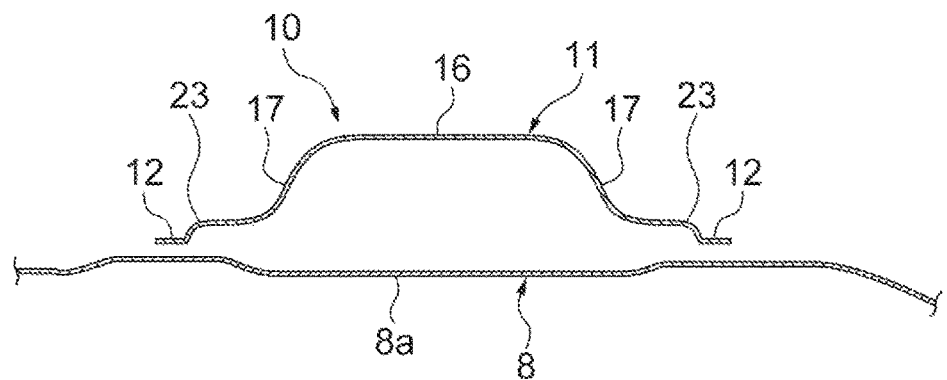
FIG. 4A is a sectional view taken along line IVA-IVA in FIG. 3.
Figure 4B:
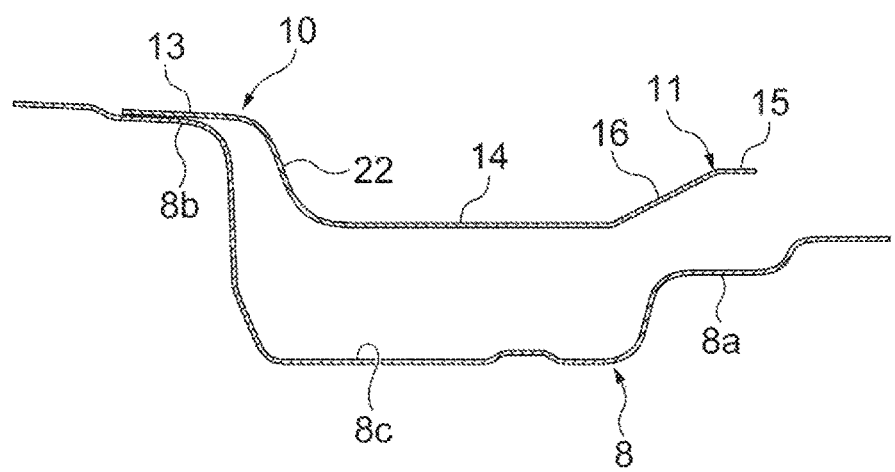
FIG. 4B is a sectional view taken along line IVB-IVB in FIG. 3.
Figure 4C:
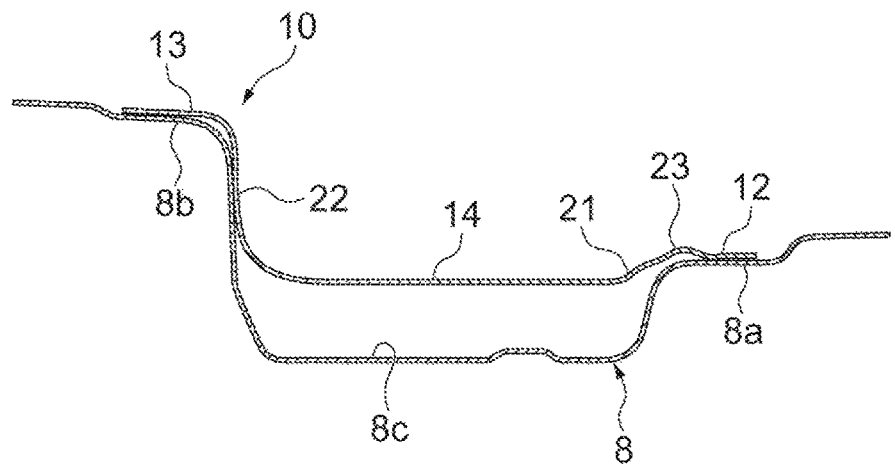
FIG. 4C is a sectional view taken along line IVC-IVC in FIG. 3.

FIG. 3 is a plan view illustrating the wiper mount bracket according to the embodiment of the present disclosure. FIG. 4A is a sectional view taken along line IVA-IVA in FIG. 3, FIG. 4B is a sectional view taken along line IVB-IVB in FIG. 3, and FIG. 4C is a sectional view taken along line IVC-IVC in FIG. 3. In FIGS. 3 to 4C, the wiper mount bracket 10 according to the embodiment is bonded to the cowl top outer 8 through a plurality of times of spot welding.

The wiper mount bracket 10 is provided with an attachment portion 11 that has an inverted U-shaped section, a pair of welded portions 12 (first welded portion) disposed on right and left sides of the attachment portion 11 in the vehicle width direction with the attachment portion 11 interposed therebetween, a welded portion 13 (second welded portion) disposed below the attachment portion 11 and the welded portions 12, and a recess portion 14 disposed between the second welded portion 13 and the attachment portion 11 together with the first welded portions 12.

The wiper motor link 6 of the wiper driving unit 4 is attached to the attachment portion 11. The attachment portion 11 is provided with a top wall 15, an attachment wall 16 that is provided to be connected to a lower end of the top wall 15, and a pair of side walls 17 provided to be respectively connected to opposite ends of the top wall 15 and the attachment wall 16.

The wiper motor link 6 is attached to the attachment wall 16 with a bolt and a nut, for example. The attachment wall 16 is bent downward from the lower end of the top wall 15. The attachment wall 16 is inclined with respect to the top wall 15. Each side wall 17 is bent backward from the opposite ends of the top wall 15 and the attachment wall 16.

The welded portions 12 are connected to opposite ends of the attachment portion 11. Specifically, the welded portions 12 are connected to the side walls 17 of the attachment portion 11. The welded portions 12 are bonded to an upper wall portion 8a of the cowl top outer 8 through spot welding. Each of the welded portions 12 is provided with one welding point 19 (spot).

The welded portion 13 is disposed on one side with respect to the attachment portion 11 and the welded portions 12 in a direction perpendicular to an arrangement direction of the pair of welded portions 12. The welded portion 13 is bonded to a lower wall portion 8b of the cowl top outer 8 through spot welding. The welded portion 13 is provided with a plurality of (here, three) welding points 20.

The recess portion 14 is connected to a lower end of the attachment wall 16 of the attachment portion 11 and is connected to lower ends of the welded portions 12 via level difference portions 21. The level difference portions 21 are inclined with respect to the welded portions 12. In addition, the recess portion 14 is connected to an upper end of the welded portion 13 via a level difference portion 22. The recess portion 14 is accommodated in a recess portion 8c disposed between the upper wall portion 8a and the lower wall portion 8b of the cowl top outer 8.

In the vicinity of each of the welding points 19 of the welded portions 12, a protruding bead 23 through which an input load from the wiper motor link 6 of the wiper driving unit 4 is transmitted toward an outer edge 12a of the welded portion 12 is provided. The bead 23 is provided between the welding point 19 of the welded portion 12 and the level difference portion 21. Since the welded portion 12 is provided with such a bead 23, the rigidity of a region between the welding point 19 of the welded portion 12 and the level difference portion 21 becomes high.

The bead 23 has an approximately triangular shape that becomes narrower toward the outer edge 12a of the welded portion 12 from the side wall 17 of the attachment portion 11 in a plan view (refer to FIG. 3). In addition, the bead 23 has a mountain-like shape as seen in a side sectional view (refer to FIG. 4C).

Figure 5:
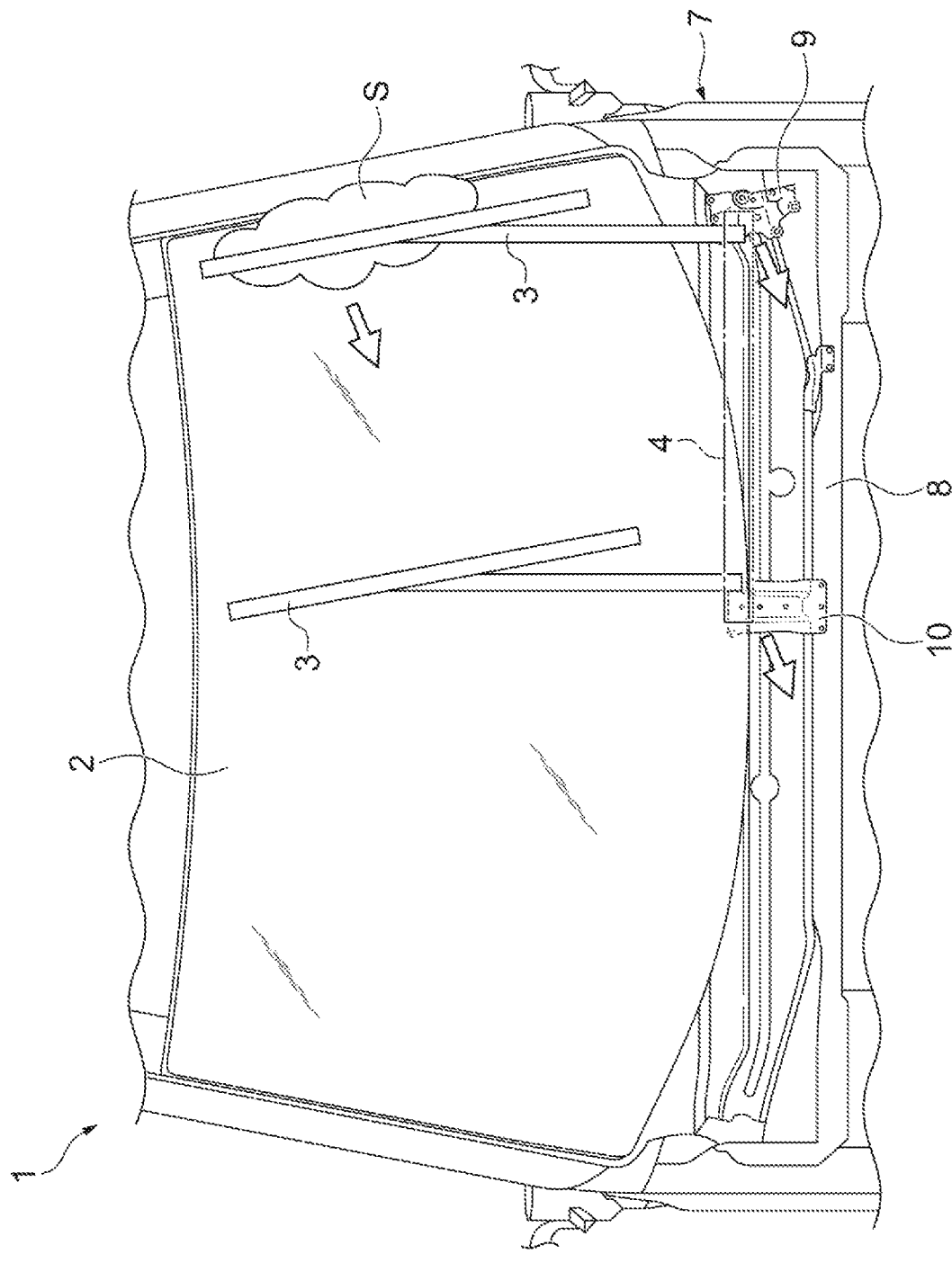
FIG. 5 is a view illustrating the way in which a reaction force from accumulated snow on a windshield illustrated in FIG. 1 is input to the wiper driving unit.

Meanwhile, as illustrated in FIG. 5, when the wipers 3 are operated in a state where snow is accumulated on the windshield 2, a reaction force from accumulated snow S is input to the wiper mount bracket 10 via the wipers 3 and the wiper motor link 6 in some cases.

Figure 6:
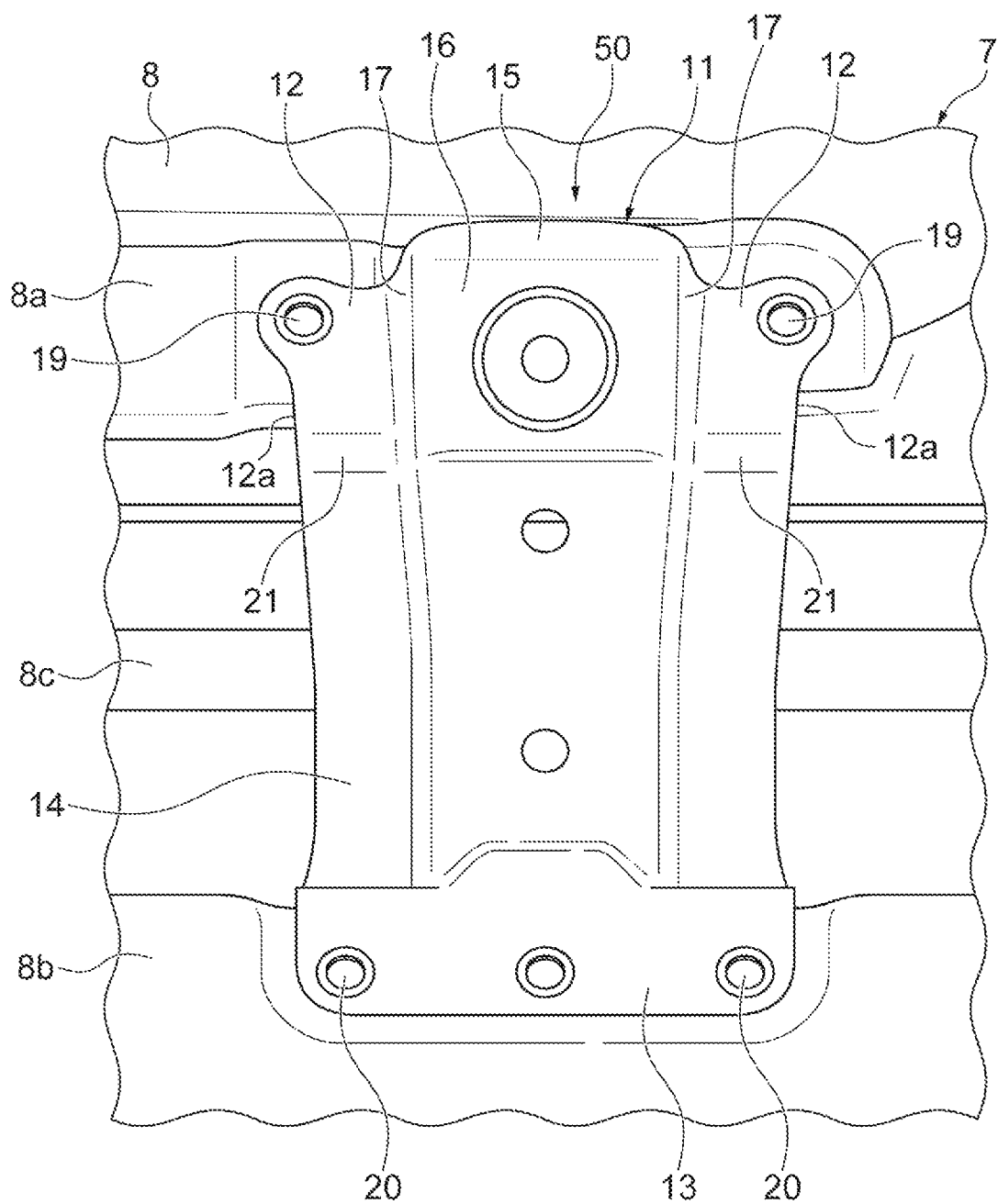
FIG. 6 is a plan view which illustrates an example of a wiper mount bracket in the related art as a comparative example.

FIG. 6 is a plan view which illustrates an example of a wiper mount bracket in the related art as a comparative example. In FIG. 6, in the case of a wiper mount bracket 50 according to the present comparative example, the beads 23 are not provided on the welded portions 12.

Figure 7:
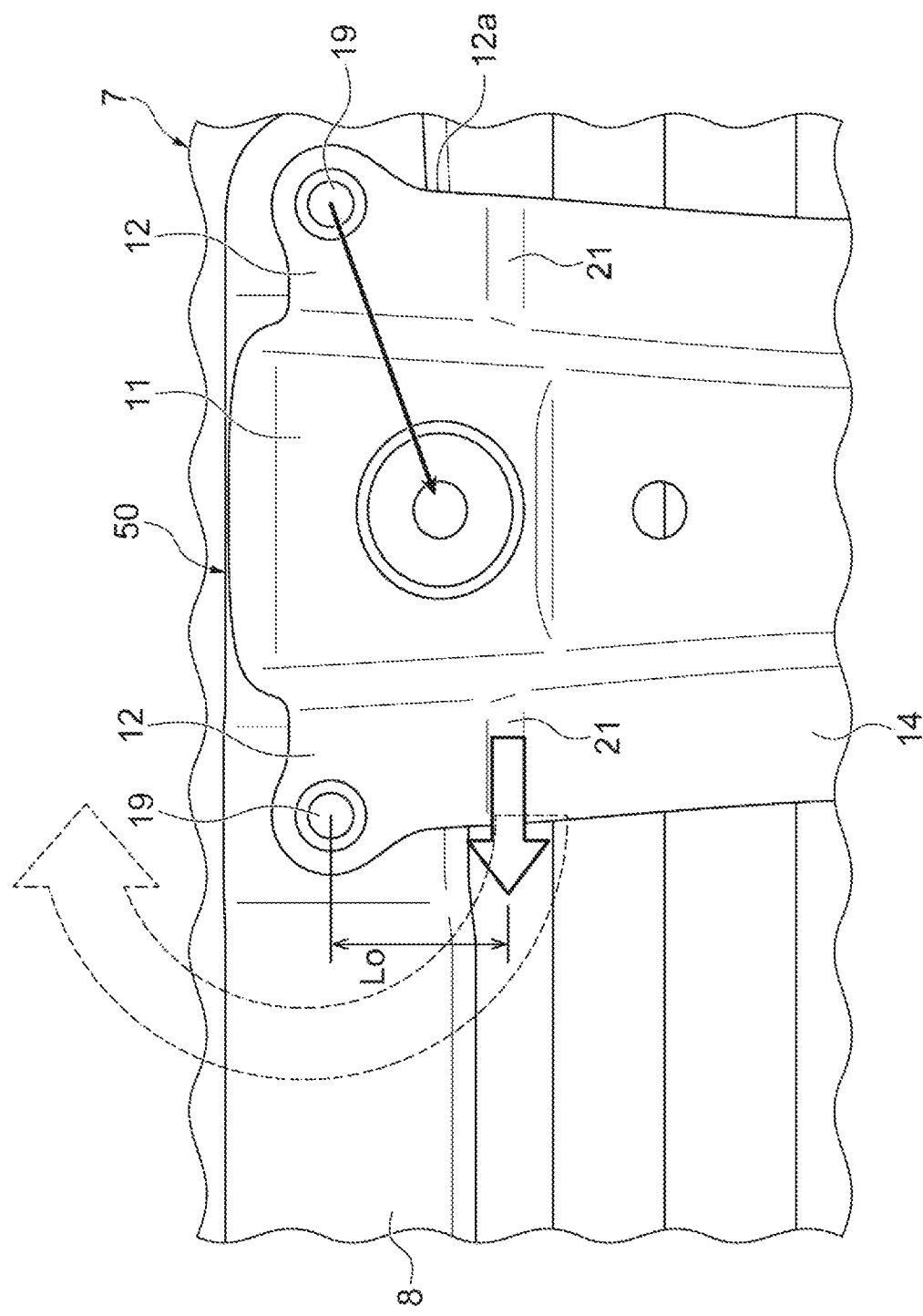
FIG. 7 is a view illustrating the way in which a load input to the wiper mount bracket illustrated in FIG. 6 is transmitted.

In the case of the wiper mount bracket 50, when a load is input to the attachment portion 11 from the wiper motor link 6 of the wiper driving unit 4, the input load is transmitted toward the outer edge 12a of the welded portion 12 along a ridge of the level difference portion 21, which has a high rigidity, as illustrated in FIG. 7. Therefore, the wiper mount bracket 50 is deformed to rotate around the welding point 19 of the welded portion 12 and a moment is generated on the welding point 19. At this time, since a moment arm $L_0$ from the level difference portion 21 to the welding point 19 is large, a moment generated on the welding point 19 becomes large. Therefore, a torque generated on the welding point 19 becomes large and thus there is a possibility that a crack is generated in a bonding portion between the wiper mount bracket 50 and the cowl top outer 8 and in the cowl top outer 8 itself.

Figure 8:
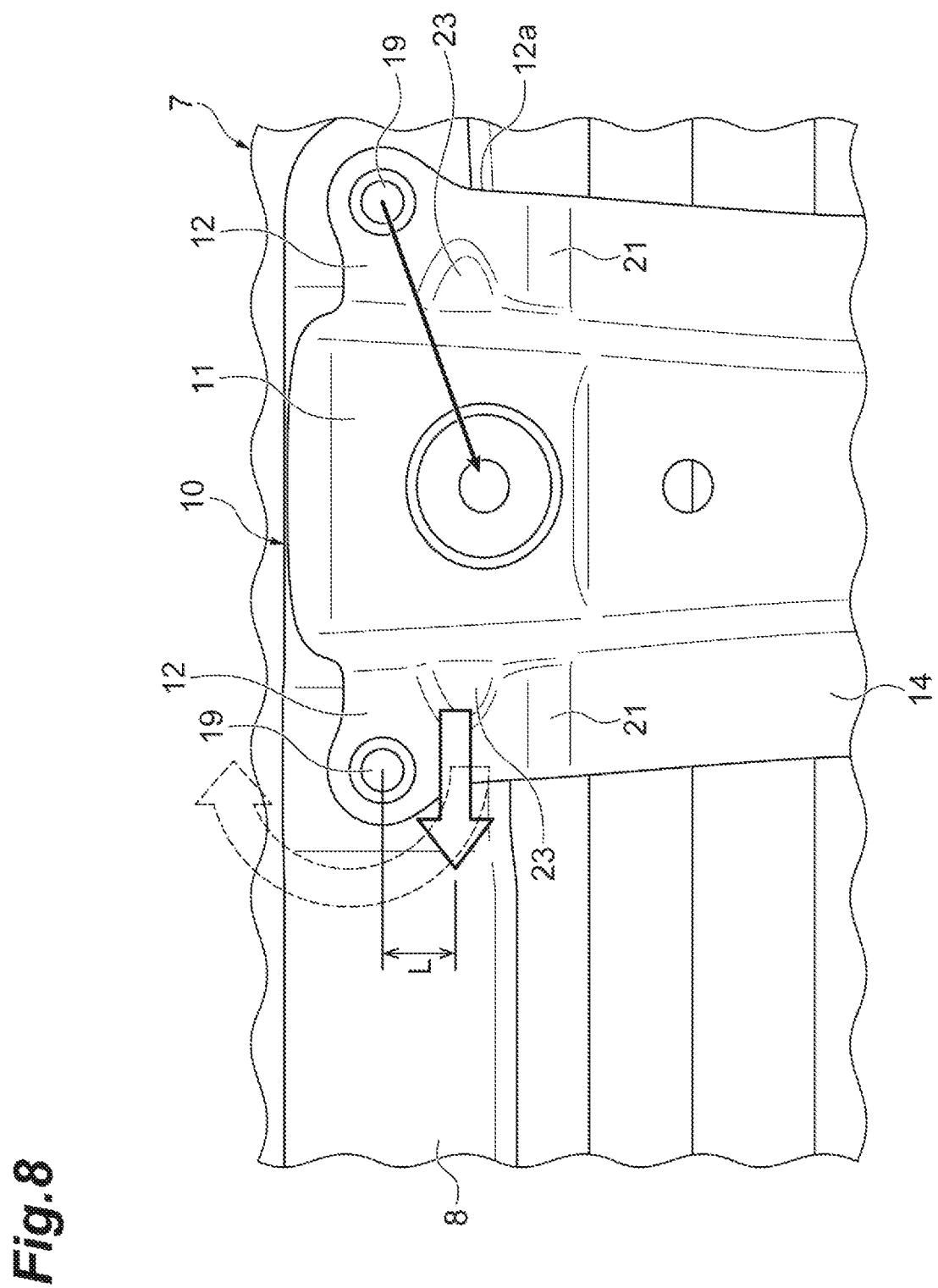
FIG. 8 is a view illustrating the way in which a load input to the wiper mount bracket illustrated in FIG. 3 is transmitted.

With regard to such a problem, in the case of the wiper mount bracket 10 of the present embodiment, when a load is input to the attachment portion 11 from the wiper motor link 6 of the wiper driving unit 4, the input load is transmitted along a bent portion of the bead 23, which has a high rigidity, as illustrated in FIG. 8. Therefore, the wiper mount bracket 10 is deformed to rotate around the welding point 19 of the welded portion 12 and a moment is generated on the welding point 19. At this time, the bead 23 is disposed in the vicinity of the welding point 19 of the welded portion 12. That is, the bead 23 is disposed closer to the welding point 19 side than the level difference portion 21 that connects the welded portion 12 and the recess portion 14 to each other. A moment arm L from the bead 23 to the welding point 19 is smaller than the moment arm $L_0$ from the level difference portion 21 to the welding point 19. Therefore, a moment generated on the welding point 19 becomes small and a torque generated on the welding point 19 is reduced. As a result, it is possible to prevent a crack that is generated in a bonding portion between the wiper mount bracket 10 and the cowl top outer 8 and in the cowl top outer 8 itself.

In addition, in the present embodiment, the bead 23 has an approximately triangular shape that becomes narrower toward the outer edge 12a of the welded portion 12 from the attachment portion 11. According to such a configuration, an input load from the wiper driving unit 4 is likely to be transmitted toward the outer edge 12a of the welded portion 12 along the bead 23.

Figure 9:
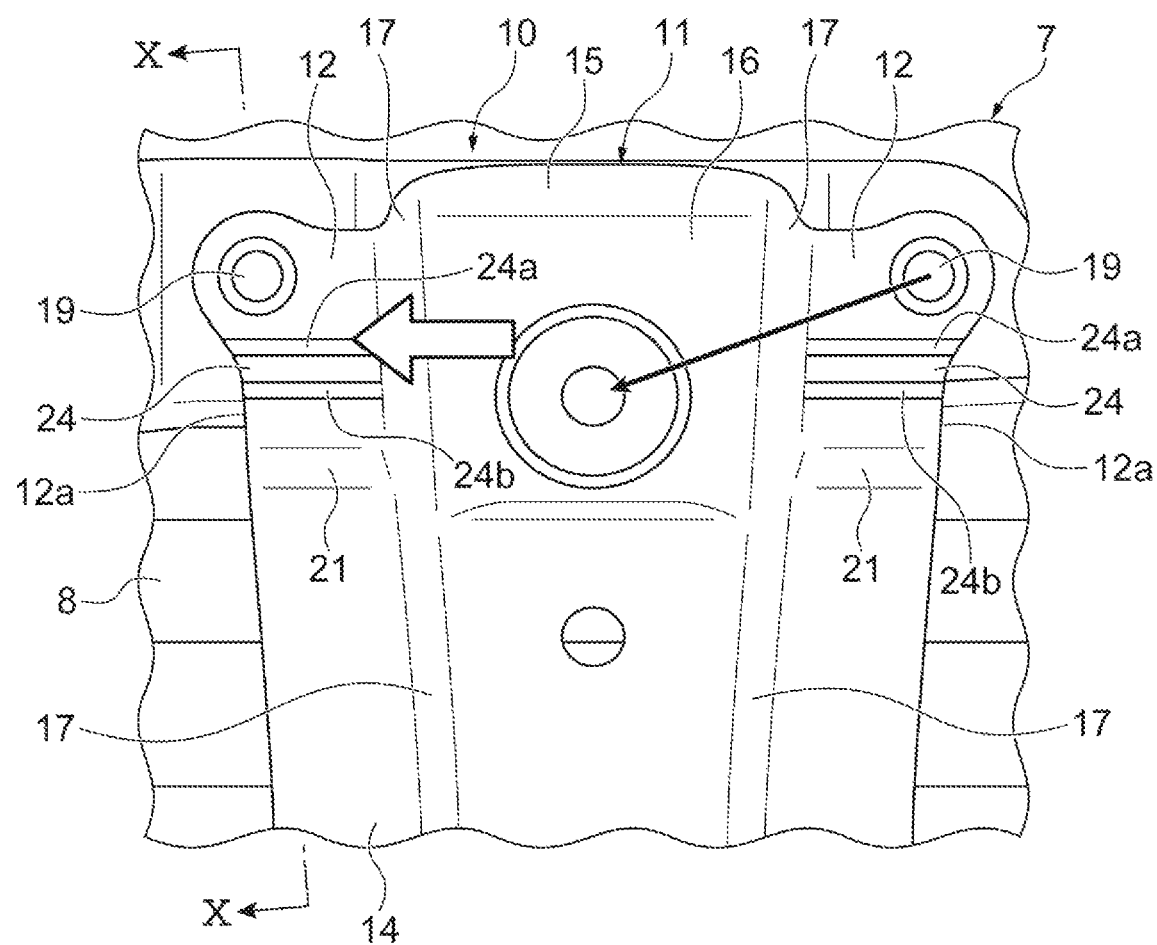
FIG. 9 is a plan view illustrating a wiper mount bracket according to another embodiment of the present disclosure.
Figure 10:
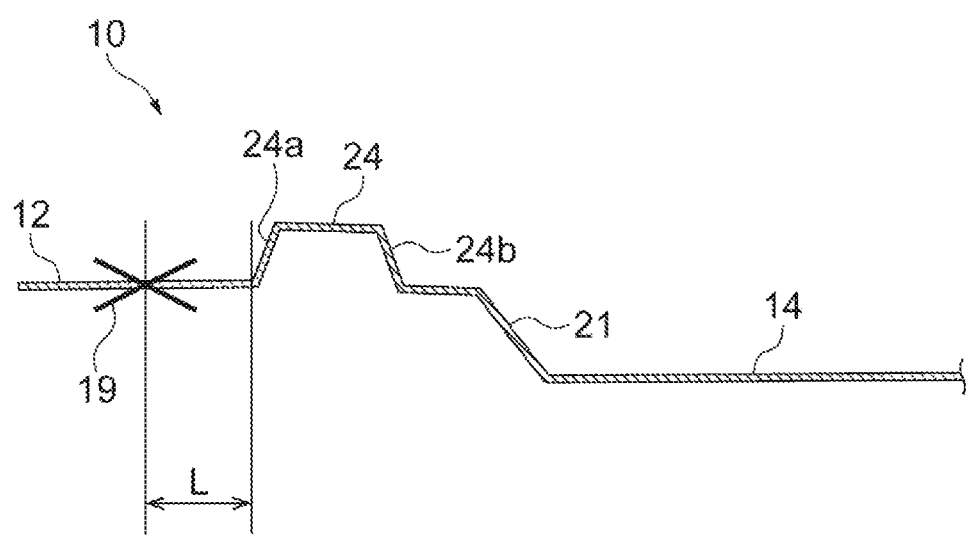
FIG. 10 is a sectional view taken along line X-X in FIG. 9.

FIG. 9 is a plan view illustrating a wiper mount bracket according to another embodiment of the present disclosure. FIG. 10 is a sectional view taken along line X-X in FIG. 9. In FIGS. 9 and 10, the wiper mount bracket 10 according to the present embodiment is provided with the attachment portion 11, the welded portions 12 and 13, and the recess portion 14 as with the above-described embodiment.

Each welded portion 12 is provided with a protruding bead 24 instead of the bead 23. The bead 24 is provided between the welding point 19 of the welded portion 12 and the level difference portion 21. The bead 24 extends straight from the side wall 17 of the attachment portion 11 to the outer edge 12a of the welded portion 12. The bead 24 is provided with two rising portions 24a and 24b. The rising portion 24a is disposed on the welding point 19 side. The rising portion 24b is disposed on the recess portion 14 side. The rising portions 24a and 24b rise from a surface of the welded portion 12.

In the present embodiment as described above, an input load from the wiper driving unit 4 is transmitted along a bent portion of the bead 24 and thus a moment is generated on the welding point 19. At this time, since the moment arm L from the bead 24 to the welding point 19 is small, a moment generated on the welding point 19 becomes small. Therefore, a torque generated on the welding point 19 is reduced as with the above-described embodiment.

In addition, in the present embodiment, the bead 24 extends from the attachment portion 11 to the outer edge 12a of the welded portion 12. Therefore, an input load from the wiper driving unit 4 is smoothly transmitted to the outer edge 12a of the welded portion 12 along the bead 24.

Figure 11:
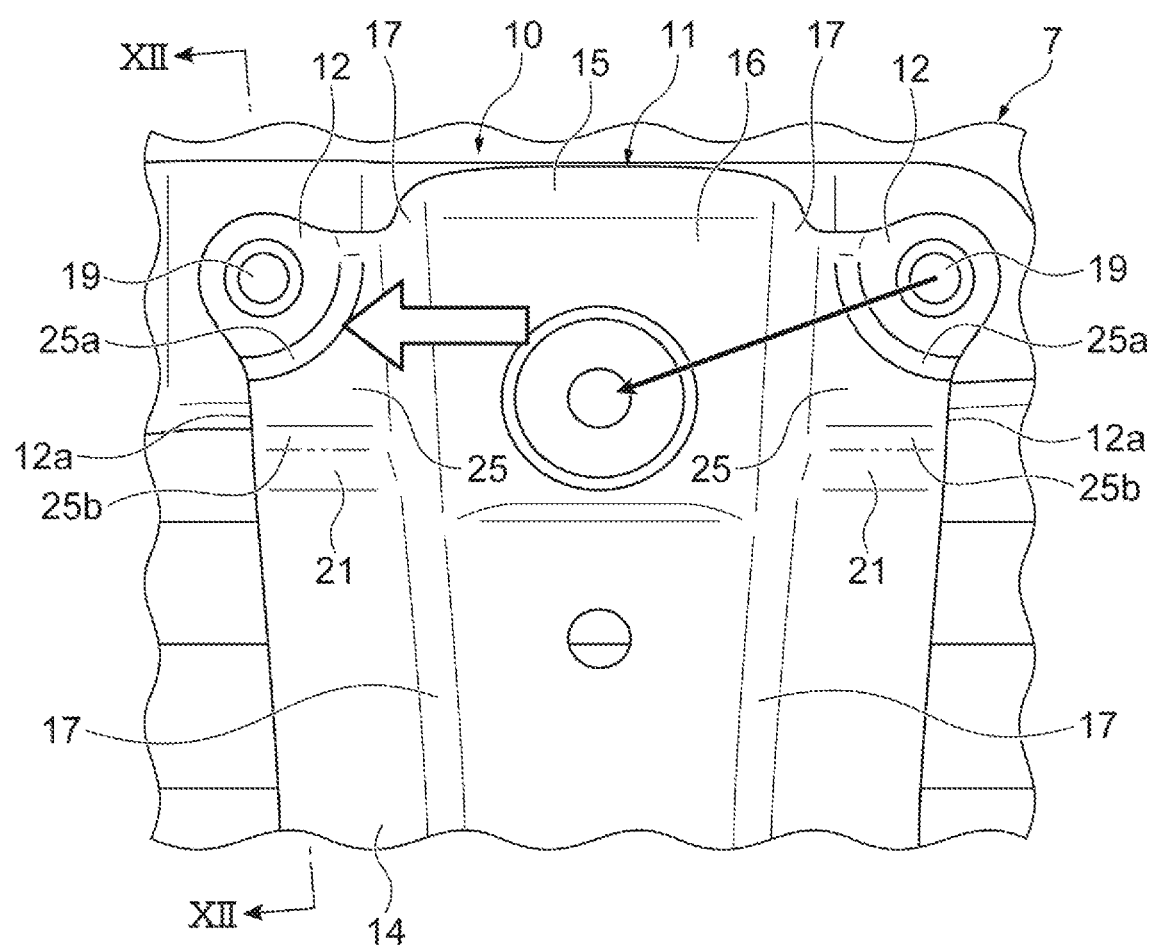
FIG. 11 is a plan view illustrating a wiper mount bracket according to still another embodiment of the present disclosure.
Figure 12:
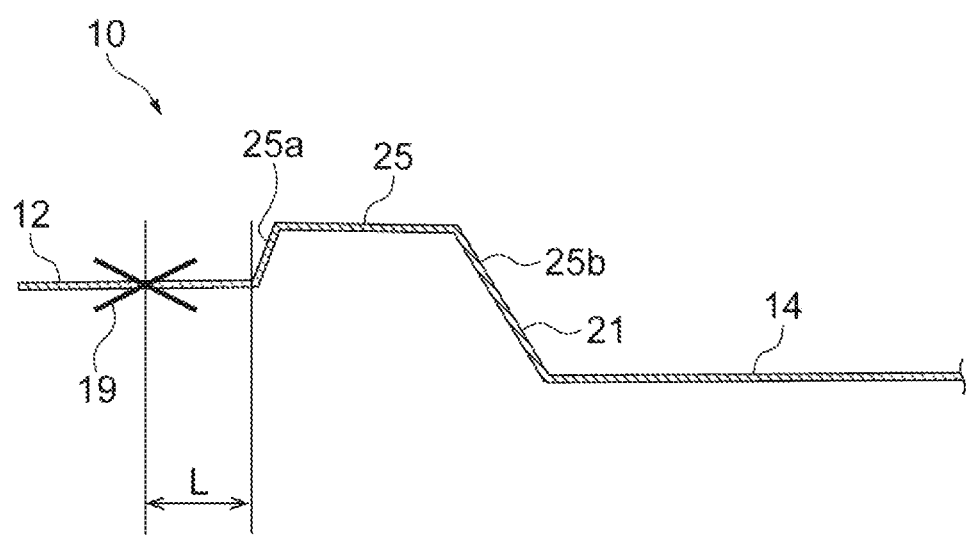
FIG. 12 is a sectional view taken along line XII-XII in FIG. 11.

FIG. 11 is a plan view illustrating a wiper mount bracket according to still another embodiment of the present disclosure. FIG. 12 is a sectional view taken along line XII-XII in FIG. 11. In FIGS. 11 and 12, the wiper mount bracket 10 according to the present embodiment is provided with the attachment portion 11, the welded portions 12 and 13, and the recess portion 14 as with the above-described embodiments.

Each welded portion 12 is provided with a protruding bead 25 instead of the bead 23. The bead 25 is provided between the welding point 19 of the welded portion 12 and the level difference portion 21. The bead 25 has a shape that becomes narrower toward the outer edge 12a of the welded portion 12 from the side wall 17 of the attachment portion 11 in a plan view.

The bead 25 is provided with two rising portions 25a and 25b. The rising portion 25a is disposed on the welding point 19 side. The rising portion 25b is disposed on the recess portion 14 side. The rising portion 25a is formed to have a curved shape such that the rising portion 25a surrounds the welding point 19. The rising portion 25a rises from a surface of the welded portion 12.

The rising portion 25b is integrated with the level difference portion 21 that connects the welded portion 12 and the recess portion 14 to each other. Specifically, the rising portion 25b is provided to be continuous with the level difference portion 21. That is, the rising portion 25b is not configured to rise from the surface of the welded portion 12.

In the present embodiment as described above, an input load from the wiper driving unit 4 is transmitted along a bent portion of the bead 25 and thus a moment is generated on the welding point 19. At this time, since the moment arm L from the bead 25 to the welding point 19 is small, a moment generated on the welding point 19 becomes small. Therefore, a torque generated on the welding point 19 is reduced as with the above-described embodiments.

In addition, in the present embodiment, the bead 25 is provided with the rising portion 25b integrated with the level difference portion 21 that connects the welded portion 12 and the recess portion 14 to each other. Therefore, it is possible to easily form the bead 25 together with the level difference portion 21.

Note that, the present disclosure is not limited to the above-described embodiments. For example, in the above-described embodiments, a bead is provided for each of the pair of welded portions 12. However, the present disclosure is not particularly limited the above-described embodiments and a bead may be provided only for the welded portion 12 that is on a side at which the wiper mount bracket 10 is deformed centering on the welding point 19.

In addition, as long as a load input from the wiper motor link 6 of the wiper driving unit 4 can be transmitted toward the outer edge 12a of the welded portion 12, the shape of a bead is not particularly limited to that in the above-described embodiments.

What is claimed is:

1. A wiper mount bracket for attaching a wiper driving unit driving a wiper to a vehicle body, the wiper mount bracket comprising:
   an attachment portion to which the wiper driving unit is attached and that has an inverted U-shaped section;
   a pair of first welded portions that is disposed on right and left sides of the attachment portion in a vehicle width direction with the attachment portion interposed therebetween and each one of the pair of first welded portions is provided with a first welding point to be spot welded to the vehicle body;
   a second welded portion that is disposed on one side with respect to the attachment portion and the pair of first welded portions in a direction perpendicular to the vehicle width direction and that is provided with a plurality of second welding points to be spot welded to the vehicle body; and a recess portion that is disposed between the second welded portion and the attachment portion together with the pair of first welded portions, and that is connected to the pair of first welded portions via a pair of level difference portions and connected to the second welded portion via a second level difference portion, wherein a protruding bead through which an input load from the wiper driving unit is transmitted toward an outer edge of one of the pair of first welded portions is provided in a vicinity of one of the first welding points of the one of the pair of first welded portions, wherein the protruding bead is provided between the one of the pair of first welding portions and one of the pair of first level difference portions.

2. The wiper mount bracket according to claim 1,
wherein the protruding bead has an approximately triangular shape that becomes narrower toward the outer edge of the one of the pair of first welded portions from the attachment portion.

3. The wiper mount bracket according to claim 1,
wherein the protruding bead extends to the outer edge of the one of the pair of first welded portions from the attachment portion.

4. The wiper mount bracket according to claim 1,
wherein the protruding bead is provided with a rising portion integrated with the one of the first level difference portions.

* * * * *